Fig. 2

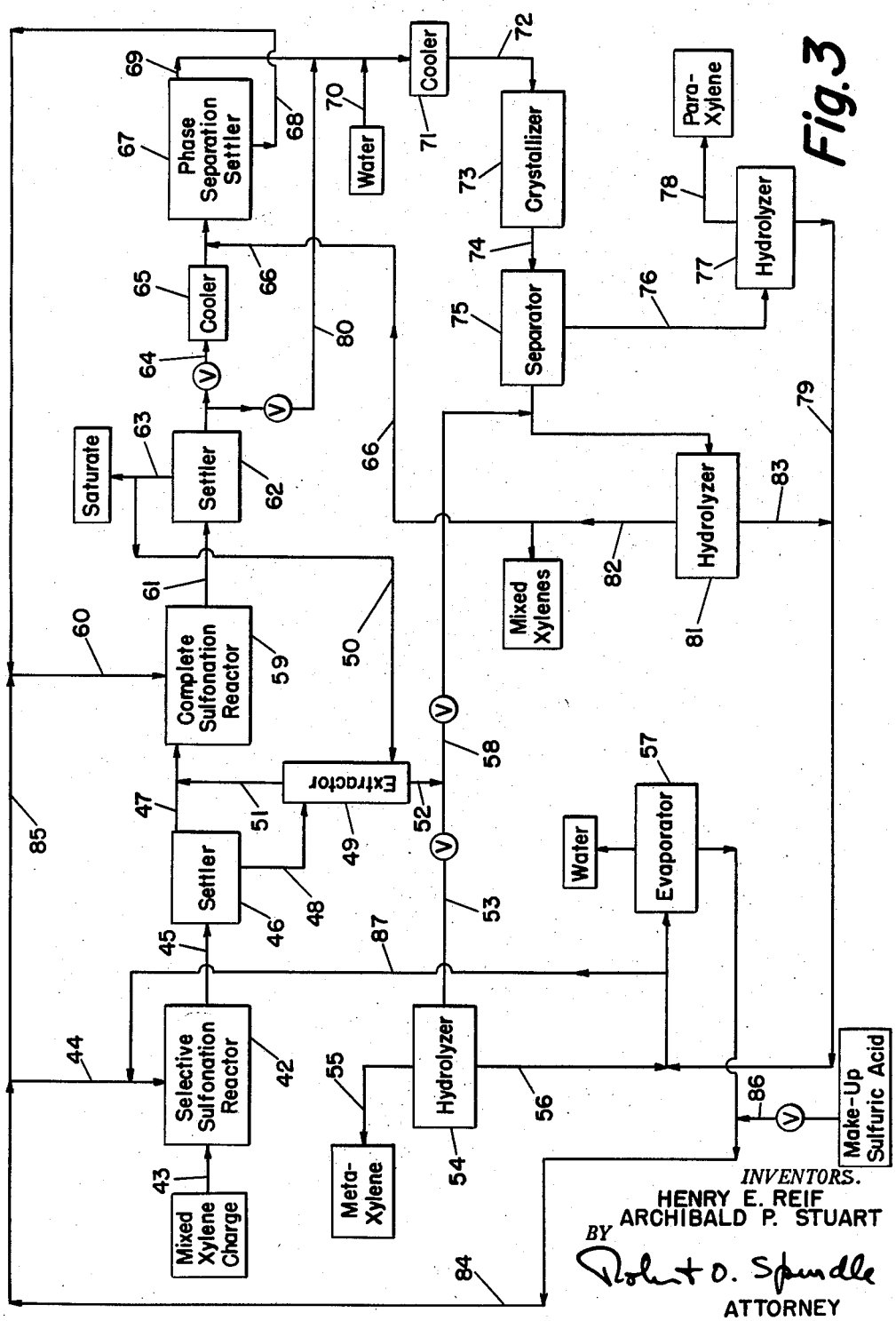

United States Patent Office 2,848,483
Patented Aug. 19, 1958

2,848,483
SEPARATION OF XYLENES

Henry E. Reif, Drexel Hill, and Archibald P. Stuart, Media, Pa., assignors to Sun Oil Company, Philadelphia, Pa., a corporation of New Jersey Application December 31, 1953, Serial No. 401,488

10 Claims. (Cl. 260—505)

The present invention relates to the separation of xylenes and deals more particularly with the separation of xylene mixtures comprising meta- and para-xylene by procedures involving sulfonation.

Commercial xylene mixtures generally contain the three xylene isomers, ortho-, meta-, and para-xylene, together with ethylbenzene and saturate hydrocarbon impurities. Ortho-xylene may be separated from commercial xylene mixtures by fractional distillation but the separation of meta- and para-xylenes by distillation is impractical due to the closeness of their boiling points.

The prior art has provided methods for separating meta- and para-xylene utilizing differences in the ease of sulfonation and crystallization of these isomeric xylenes along with differences in the ease of hydrolysis and crystallization of their sulfonic acids.

It has been proposed heretofore to separate meta- and para-xylene by partially sulfonating a mixture of the xylenes under conditions whereby the meta-xylene is selectively sulfonated, separating the sulfonated phase from the unsulfonated oil, and fractionally hydrolyzing the sulfonated phase to separate an intermediate meta-xylene hydrolysis fraction from initial and final para-xylene rich hydrolysis fractions. The para-xylene rich fractions are then combined with the unsulfonated oil and further processed for the recovery of para-xylene. A disadvantage of such a method is that costly fractional hydrolysis is necessary after the selective sulfonation to recover a high purity meta-xylene while avoiding loss of para-xylene.

It has also been proposed to separate meta- and para-xylenes by completely sulfonating the mixture of xylenes, fractionally hydrolyzing the sulfonated mixture to recover a meta-xylene fraction, and crystallizing para-xylene sulfonic acid from the hydrolysis residue. This procedure is disadvantageous in commercial operation in that a large excess of concentrated sulfuric acid is necessary for rapid complete sulfonation while considerable dilution of the excess acid with water is desirable for high product yield in the later crystallization step. This necessitates an expensive reconcentration of the sulfuric acid.

An object of the present invention is to provide improved procedures for the preparation of meta- and para-xylene concentrates in high yields from commercial xylene mixtures. Other objects appear hereinafter.

Figure 2 is a three-component phase diagram for the system comprising xylene sulfonic acid, $H_2SO_4$, and $H_2O$, at 25° C.

Figure 3 illustrates in diagrammatic form the process steps of a second embodiment of the invention.

Figure 1:
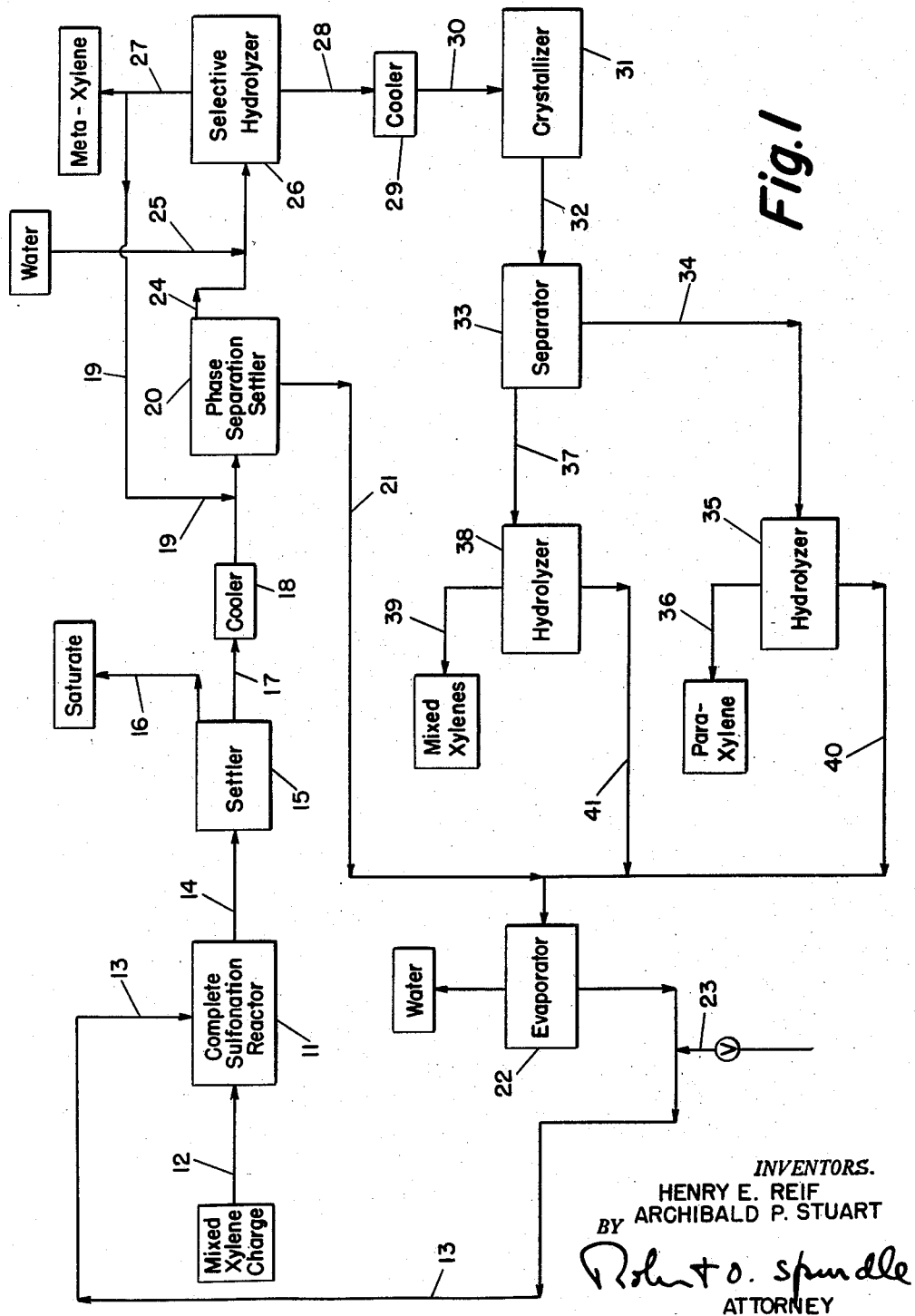
Figure 1 illustrates in diagrammatic form the process steps of one embodiment of the invention.

In accordance with one embodiment of this invention meta- and para-xylenes are separated from a mixture thereof by completely sulfonating the mixture of xylenes to form the mono-sulfonic acid of substantially all the xylenes contained therein, subjecting the sulfonation reaction mixture to a phase separation whereby excess sulfonating agent is separated from the sulfonated xylenes, fractionally hydrolyzing said sulfonated xylenes to obtain a product concentrate of meta-xylene, precipitating a concentrate of para-xylene sulfonic acid from the residue of said hydrolysis, and hydrolyzing the para-xylene sulfonic acid concentrate to recover a product concentrate of para-xylene.

Meta- and para-xylene concentrates can be separated from commercial xylene mixtures containing the three xylene isomers, ortho-, meta-, and para-xylenes together with ethylbenzene and saturate hydrocarbon impurities in accordance with this embodiment of the present invention. It is preferable, however, to remove the ortho-xylene by fractional distillation before separating meta- and para-xylenes by this procedure of the present invention.

The process steps of this embodiment of the present invention are shown in Figure 1 of the accompanying drawings. The xylene mixture comprising meta- and para-xylenes is completely sulfonated in reactor 11 under conditions such that substantially all the xylenes are converted to the mono-sulfonic acid. The xylene mixture enters the reactor through line 12, and the sulfonating agent is introduced therein by means of line 13.

The sulfonation of xylenes may be accomplished using sulfonating agents such as sulfur trioxide or fuming sulfuric acid; however, considering the ease of reconcentrating the spent sulfonating agent for re-use in a cyclic operation, it is preferable to use a strong aqueous sulfuric acid to perform the sulfonation reaction. Water is formed in the reaction between sulfuric acid and xylenes, and to overcome dilution of the sulfonating agent by water of reaction and to insure rapid and complete mono-sulfonation an excess of said preferred sulfonating agent should be used. The sulfonation should be carried out under such conditions that the resulting reaction mixture has a composition within the area ABCDEF in the three-component phase diagram shown in Fig. 2, and preferably within the area GHIJ. The importance of these composition ranges may be seen from the discussion hereinafter.

As is well known, a number of reaction conditions may be employed for the complete mono-sulfonation of xylenes. It is preferable in the present process to carry out the reaction using about 80 to 85% sulfuric acid as the sulfonating agent in amount equivalent to about 4 to 6 moles of $H_2SO_4$ per mole of xylenes, at a reaction temperature of about 130° C. Under these preferred conditions the xylenes are completely mono-sulfonated in about 12 to 20 minutes' reaction time, and the resulting reaction mixture has a composition suitable for the separation of excess sulfonating agent as hereinafter described.

After the mono-sulfonation of substantially all the xylenes, the reaction mixture is removed from the reactor and introduced into settler 15 by means of line 14. Saturate hydrocarbons present in the original charge xylene mixture are substantially inert during the aforedescribed sulfonation reaction and separate on settling of the reaction mixture to form an upper liquid layer. The saturate hydrocarbon layer is removed as by decantation through line 16. In this manner substantially all the saturate hydrocarbons are removed, and the subsequently obtained xylene products are substantially completely saturate free.

The lower layer comprising a mixture of sulfonated xylenes and aqueous sulfuric acid is removed from settler 15 by means of line 17 and subjected to conditions which cause a phase separation whereby aqueous sulfuric acid is separated from the sulfonated xylenes.

Figure 2:
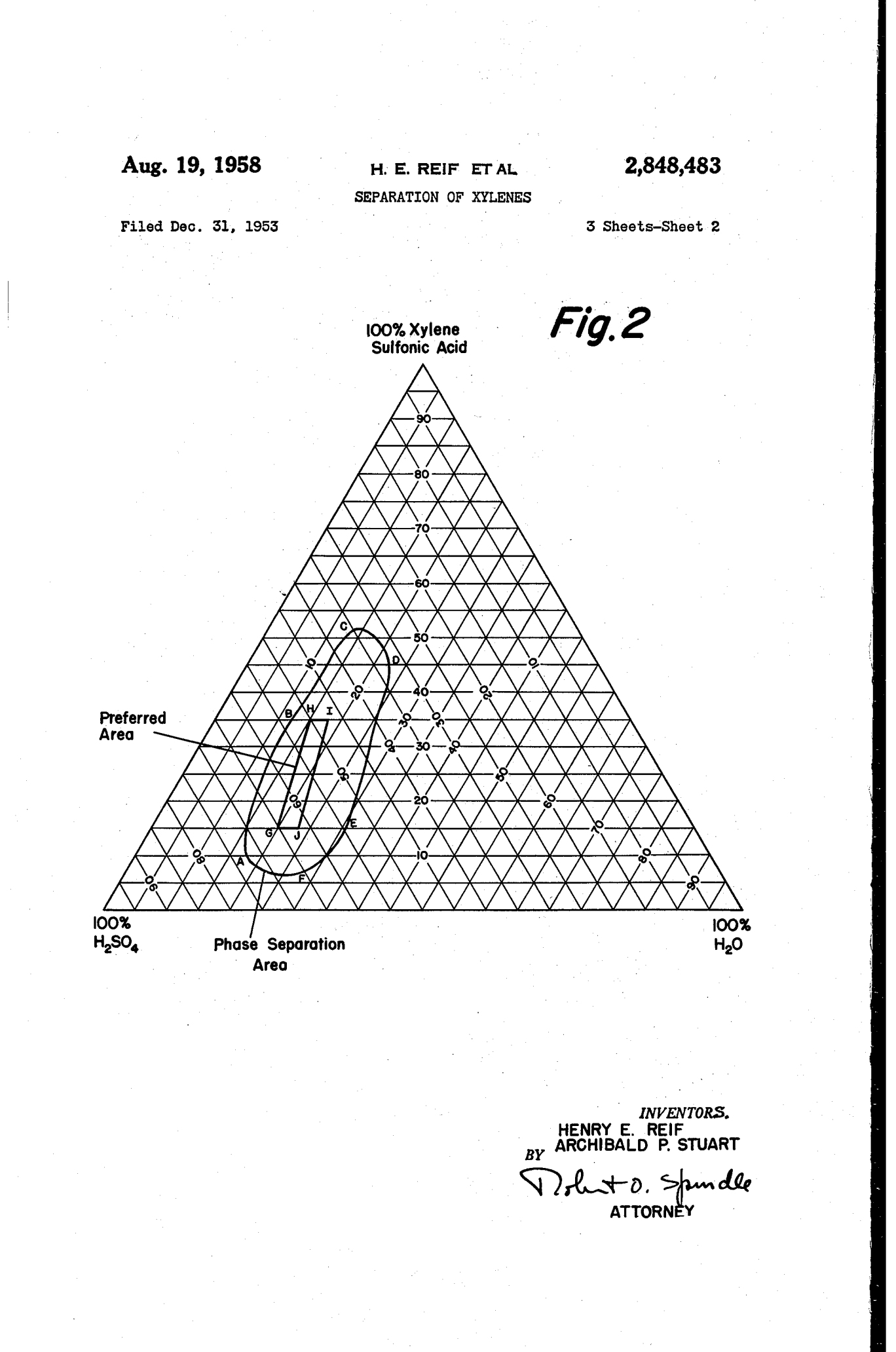

Mixtures comprising xylene sulfonic acids and aqueous sulfuric acid within certain concentration ranges, and also containing an aromatic hydrocarbon in excess of the amount soluble in said xylene sulfonic and aqueous sulfuric acids, will upon settling, separate into three immiscible liquid phases—an upper aromatic hydrocarbon phase; an intermediate xylene sulfonic acid phase comprising a concentrate of xylene sulfonic acids together with aqueous sulfuric acid and dissolved aromatic hydrocarbon; and a lower aqueous sulfuric acid phase comprising mainly aqueous sulfuric acid with a minor amount of xylene sulfonic acids. The mixture prior to separation must, in order to separate into three phases, have a composition by weight in the area ABCDEF as shown in Figure 2, and also must contain an aromatic hydrocarbon in excess of the soluble amount. A mixture of xylene sulfonic acid and aqueous sulfonic acid with a composition with the area ABCDEF of Fig. 2, and also containing an aromatic hydrocarbon in amount just sufficient to saturate the mixture, will undergo a phase separation similar to that described above except that no upper excess aromatic hydrocarbon phase is formed. Generally aromatic hydrocarbon in amount of about 1% to 5% by weight of the mixture is sufficient to saturate the mixture. Mixtures of a composition outside the said enclosed range will not undergo the phase separation. The phase separation will occur at any temperature between the crystallization temperature and the hydrolyzing temperature, for example, within the range of about 25° C. to 130° C. The amount of xylene sulfonic acid phase that results increases both as the phase separation temperature is lowered and as the concentration of xylene sulfonic acid in the total mixture is increased, due to the presence of larger amounts of both sulfonic and sulfuric acids.

In the preferred practice of this invention, as hereinbefore described, the complete sulfonation reaction is performed such that the resulting sulfonated mixture has a composition in the area bounded by GHIJ of Fig. 2. The phase separation of mixtures within this preferred area of composition results in the incorporation of a predominance of the xylene sulfonic acids in the xylene sulfonic acid phase while at the same time a substantial proportion of the excess sulfonating agent is contained in the lower phase. The preferred composition area is bounded by concentrations of xylene sulfonic acid in the total mixture ranging from 15% to 35% and by concentrations of $H_2SO_4$ based on the aqueous sulfuric acid content, ranging from 73% to 77%. This $H_2SO_4$ concentration range represents the preferred upper and lower sulfonating agent strength at the completion of the xylene sulfonation. The sulfonation reaction does not proceed as readily with weaker than 73% aqueous sulfuric acid unless the sulfonation is conducted under pressure at advanced temperatures, while reactions resulting in a final sulfonating agent strength greater than 77% require a larger excess of sulfonating agent. The 15–35% xylene sulfonic acid concentration range is preferred so that a predominance of the sulfonic acids will be contained in the xylene sulfonic acid phase while about 35% to 75% of the excess sulfonating agent will be in the lower phase. A relatively low phase separation temperature is preferred to aid in incorporating a predominance of the sulfonic acids in the intermediate phase.

In the embodiment of the invention illustrated in Figure 1 the mixture comprising xylene sulfonic acids and aqueous sulfuric acid from settler 15 preferably is introduced into cooler 18 and therein cooled to a temperature in the range of about 25° C. to 50° C. An aromatic hydrocarbon is introduced into said cooled mixture by means of line 19 in excess of the amount soluble in the mixture, and the resulting mixture is settled in settler 20. Any aromatic hydrocarbon which is liquid at the operating temperature may be used to effect the phase separation. For example, the aromatic hydrocarbon can be benzene, toluene, xylenes, ethylbenzene, the $C_9$ aromatics, butylbenzene, naphthalene, etc. However, it is distinctly preferable to employ for this purpose a portion of the meta-xylene product obtained as hereinafter later described, since this avoids any necessity of introducing an aromatic material from an outside source.

In settler 20 three immiscible liquid phases are obtained. The lower aqueous sulfuric acid phase is removed from settler 20 by means of line 21 and introduced into evaporator 22 wherein the sulfuric acid is concentrated by removing water under conditions avoiding hydrolysis of the xylene sulfonic acids. As is well known, such conditions involve the use of a low evaporation temperature effected by reduced pressure. The concentrated sulfuric acid together with contained xylene sulfonic acids is recycled to reactor 11 by means of line 13. Make-up sulfuric acid is introduced into line 13 as needed by means of line 23.

The phase separation step is highly advantageous in that more than 75% of the aqueous sulfuric acid remaining in the reaction mixture after sulfonation can be removed and hence need not pass to the selective hydrolysis and crystallizing steps described below. Since the xylene sulfonic acids removed with the sulfuric acid are recycled to the sulfonation step, there is substantially no loss of xylene sulfonic acids through utilization of this novel phase separation procedure.

The upper aromatic and intermediate xylene sulfonic acid phases are removed from settler 20 by means of line 24 and a meta-xylene product concentrate is obtained therefrom by fractional hydrolysis in hydrolyzer 26. Selective hydrolysis of meta-xylene sulfonic acid should be carried out at temperatures in the range of about 130° C. to 140° C. and is preferably performed by steam distillation hydrolysis. Water is introduced into the mixture through line 25 before hydrolysis in amount sufficient to bring the concentration of the aqueous sulfuric acid contained therein to about 54–60% by weight $H_2SO_4$ (on a xylene sulfonic acid and aromatic hydrocarbon free basis), so that the boiling point of the mixture will correspond to the desired hydrolysis temperature of 130° C. to 140° C.

The hydrolysis is conducted until substantially all the hydrocarbon hydrolyzing and distilling below 140° C. is recovered as an overhead fraction by means of line 27. This fraction comprises a meta-xylene concentrate of 90% or greater purity. A portion of the product preferably is recycled by means of line 19 to the cooled sulfonated mixture to effect the phase separation previously described. The amount of meta-xylene obtained from the selective hydrolysis step generally represents a recovery of 80% or more of the meta-xylene in the charge.

The next step in the process is crystallization of a para-xylene product. The hydrolysis residue is removed from hydrolyzer 26 by means of line 28 and cooled to a temperature in the range of 0° C. to 35° C. in cooler 29. The cooled residue mixture is then introduced into crystallizer 31 through line 30, and a para-xylene sulfonic acid concentrate is precipitated therein. In order to insure high purity para-xylene sulfonic acid crystals, it is desirable that the hydrolysis residue contain more para-isomer than meta-isomer. Thus, removal of a predominance of the meta-isomer in the selective hydrolysis step serves to condition the mixture for the crystallization step.

The crystallization mixture is passed through line 32 to separator 33 and crystals are separated from the mother liquor in any suitable manner such as by filtration. The para-xylene sulfonic acid crystals are removed as indicated by line 34 and a para-xylene concentrate is recovered by hydrolysis. This can be done by steam distillation in hydrolyzer 35 at a temperature sufficient to completely hydrolyze the sulfonic acids, for example at about 170° C. The hydrolyzed para-xylene product is recovered by means of line 36 and typically comprises a 95% pure para-xylene fraction with a para-xylene recovery of 80% or greater.

The mother liquor is removed from separator 33 by means of line 37 and may be hydrolyzed as by steam distillation hydrolysis in 38 to a temperature of about 170° C. A mixed xylene product fraction is recovered through line 39.

The hydrolysis residues comprising aqueous sulfuric acid from hydrolyzers 35 and 38 are removed by means of lines 40 and 41 respectively and are concentrated in evaporator 22, together with the aqueous sulfuric acid phase from settler 20, for re-use in the process.

Figure 3 shows a second embodiment of this invention wherein a mixture of meta- and para-xylenes is separated by first selectively sulfonating the meta-xylene. The unsulfonated xylene phase containing a major proportion of the para-xylene is separated from the sulfonated phase. Para-xylene, dissolved in the sulfonated phase, is removed therefrom by extraction with a saturate hydrocarbon solvent. The resulting sulfonated phase may be either directly hydrolyzed to yield a meta-xylene concentrate or combined with a subsequently obtained mixed xylene sulfonic acid fraction and a meta-xylene concentrate obtained therefrom by crystallization and/or hydrolysis. The solvent extract containing para-xylene is combined with the unsulfonated xylene phase from the selective sulfonation, and a para-xylene concentrate is obtained therefrom by sulfonating the resulting mixture, cooling the sulfonated xylenes to crystallize para-xylene sulfonic acid, separating and hydrolyzing the para-xylene sulfonic acid to recover a concentrate of para-xylene. The mother liquor from the crystallization may be directly hydrolyzed to recover a mixed xylene fraction or combined with the sulfonated phase from the solvent extraction and a meta-xylene concentrate obtained therefrom by crystallization and/or hydrolysis.

Commercial xylene mixtures containing ortho-, meta-, and para-xylenes together with ethylbenzene and saturate hydrocarbon impurities can be separated in accordance with this second embodiment of the invention; however, a predominance of the ortho-xylene should be separated by distillation before meta-xylene and para-xylenes are separated by this present process.

Referring to Figure 3, the xylene mixture comprising meta- and para-xylenes is partially sulfonated in reactor 42 to effect selective sulfonation of the meta-xylene. The xylene mixture enters the reactor by means of line 43, and the sulfonating agent is introduced therein by means of line 44.

The selective sulfonation is preferably accomplished using about 80% sulfuric acid as the sulfonating agent at a reaction temperature of about 100° C., although 70% to 100% sulfuric acid may be used as the sulfonating agent at reaction temperatures ranging from about 80° C. to 120° C. It is desirable to use an amount of the preferred sulfonating agent in excess of that required to mono-sulfonate all the meta-xylene in order to achieve a rapid yet sufficiently selective sulfonation reaction. The sulfonation reaction should be stopped when about 50% to 60% of the meta-xylene has been sulfonated in order not to lose selectivity.

After the partial sulfonation, the resulting mixture is withdrawn from reactor 42 by means of line 45 and introduced into settler 46. On settling the mixture separates into an upper unsulfonated xylene phase containing a major proportion of the para-xylene, and a lower sulfonated phase comprising aqueous sulfuric acid, meta-xylene sulfonic acid, and a minor proportion of the para-xylene.

Xylenes are soluble to a limited extent in mixtures of xylene sulfonic acids and aqueous sulfuric acid. Thus on settling of the partially sulfonated mixture a minor amount of the unsulfonated xylenes remains dissolved in the lower sulfonated phase, and when the sulfonation is accomplished such that the lower phase comprises a greater predominance by weight of $H_2SO_4$ than sulfonated xylene said dissolved xylenes comprise a concentrate of para-xylene. The dissolved xylenes may comprise a concentrate of para-xylene amounting to more than 10% of the total para-xylene charged in a concentration of 80% or more. These dissolved xylenes may readily be extracted from the lower sulfonated phase with a saturate hydrocarbon solvent.

Depending on the composition of the partially sulfonated mixture, there may occur on settling, a separation of the mixture into three immiscible liquid phases similar to that described in connection with Figure 1. The conditions necessary for such phase separation are the same as described for the phase separation step of the previous embodiment, and the separation depends upon the composition's being within the area ABCDEF of Fig. 2. When a three phase separation occurs, a predominance of the dissolved para-xylene is contained in the intermediate xylene sulfonic acid phase but preferably both the intermediate and lower phases are subjected to the subsequent solvent extraction as illustrated in Figure 3.

The lower phase or phases comprising aqueous sulfuric acid, meta-xylene sulfonic acid, and dissolved para-xylene is passed from the settler through line 48 to extractor 49. A saturate hydrocarbon solvent is introduced into the extractor through line 50. Any liquid saturate hydrocarbon or mixture of hydrocarbons including paraffins and naphthenes, may be used for this purpose, but it is preferable to use the saturate material recovered from the charge as subsequently described. In the extraction zone the saturate hydrocarbon solvent absorbs the para-xylene and the resulting extract is removed by means of line 51. The extract may then be separated as by distillation (not shown) to obtain a para-xylene concentrate, for example, having 80% or better purity and amounting to 10% of the total para-xylene. It is preferable, however, to combine the extract with the unsulfonated hydrocarbon phase from settler 46 and subsequently process the two in admixture.

The raffinate mixture comprising aqueous sulfuric acid and meta-xylene sulfonic acid may be sent from extractor 49 through lines 52 and 53 to hydrolyzer 54 wherein complete hydrolysis is effected in a similar manner as described for the process of Figure 1, e. g. by steam distillation hydrolysis to a temperature of about 170° C. A meta-xylene concentrate in amount of 50% or more based on meta-xylene charged and having a purity of 85% or greater may be recovered by means of line 55 as an overhead distillation fraction. The aqueous sulfuric acid hydrolysis residue is passed from the hydrolyzer through line 56 to evaporator 57, wherein it is concentrated for re-use. An alternative procedure comprises passing the raffinate from extractor 49 through lines 52 and 58 for processing in admixture with mixed xylene sulfonic acids obtained as hereinafter described.

The described solvent removal of para-xylene in extractor 49 is advantageous in that a concentrate of meta-xylene can be obtained while loss of para-xylene is avoided without the necessity of costly and tedious fractional hydrolysis.

The combined mixture of unsulfonated hydrocarbon phase from settler 46 and solvent extract from extractor 49 is then subjected to a series of process steps involving complete mono-sulfonation of the xylenes, separation of the unsulfonated saturate hydrocarbon, further separation whereby a large part of the excess aqueous sulfuric acid is removed from the sulfonated xylenes, and crystallization of para-xylene sulfonic acid from the sulfonated xylenes. These process steps are performed in a manner substantially similar to that already described in the first embodiment of the present invention, and reference may be made thereto for details.

The mixture of unsulfonated hydrocarbon phase and solvent extract is introduced into reactor 59 and therein completely sulfonated under conditions such that substantially all the xylenes in the combined mixture are converted to the mono-sulfonic acid. The sulfonating agent is introduced into the reactor by means of line 60. The reaction mixture from reactor 59 is passed through line 61 to settler 62, wherein the saturate hydrocarbons separate into an upper liquid layer which is removed by means of line 63. A portion of the removed saturate hydrocarbons may be recycled to the solvent extraction step by means of line 50; the remaining portion comprises the saturate hydrocarbon product.

A preferred procedure at this point in the process is to subject the lower layer comprising aqueous sulfuric acid and xylene sulfonic acids from settler 62 to a three phase separation similar to that described for the process shown in Fig. 1. In order to effect the phase separation the composition of the sulfonated mixture must be in the area bounded by ABCDEF and is preferably within the area bounded by GHIJ in Fig. 2. The lower layer is removed from settler 62 by means of line 64 and passed to cooler 65 wherein the temperature is reduced to about 25° C. to 50° C. An aromatic hydrocarbon, preferably a portion of the mixed xylene fraction obtained as hereinafter described, is introduced into the cooled mixture by means of line 66 in excess of the soluble amount and the resulting admixture is passed into settler 67 wherein it separates into three immiscible liquid phase—an aromatic hydrocarbon phase, a xylene sulfonic acid phase, and a lower aqueous sulfuric acid phase. The lower phase is removed from the settler by means of line 68 and is combined with a stream of stronger sulfuric acid from line 85 for re-use in reactor 59.

The hydrocarbon and xylene sulfonic acid phases are removed together from settler 67 by means of line 69 and the mixture is then diluted with water introduced through line 70. The amount of water employed is sufficient to lower the $H_2SO_4$ concentration of the aqueous sulfuric acid to within the range of 40% to 70% and preferably 50% to 65% by weight $H_2SO_4$ (on a xylene sulfonic acid and aromatic hydrocarbon free basis). After dilution, the mixture is cooled in cooler 71 to a temperature in the range of about 0° C. to 35° C. and introduced into crystallizer 73 by means of line 72 to provide time for crystallization of the para-isomer. The crystallization mixture is removed by means of line 74 from the crystallizer and separated as by filtration in 75.

The para-xylene sulfonic acid is transferred, as indicated by line 76, to hydrolyzer 77 and is therein heated by steam to a temperature of about 170° C. to effect hydrolysis and distillation of the para-xylene through line 78. The product typically has a purity of 95% and contains 80% or more of the para-xylene charged to the process. The aqueous sulfuric acid hydrolysis residue is removed from hydrolyzer 77 by means of line 79 and concentrated in evaporator 57 for re-use.

As an alternative procedure, the mixture comprising aqueous sulfuric acid and xylene sulfonic acids from settler 62 may be passed directly by means of line 80 to the water dilution, cooling, and subsequent recovery steps, thus eliminating the phase separation step. However, this procedure requires a greater amount of dilution water which must subsequently be removed by evaporation before the sulfuric acid can be re-used.

The mother liquor from the separator 75 may be directly passed to hydrolyzer 81 from which a mixed xylene overhead product is obtained by means of line 82. This product typically comprises a 60% concentrate of meta-xylene with about a 48% recovery of the meta-xylene charged.

As previously mentioned, the raffinate from extractor 49 may be added through line 58 to the mother liquor. In such case the product obtained from the hydrolysis typically will have a meta-xylene content of about 70% and will contain about 95% or more of the meta-xylene charged.

The sulfuric acid residue from hydrolyzer 81 is removed by means of line 83 and concentrated in evaporator 57. The concentrated acid from 57 is recycled to reactor 42 by means of lines 84 and 44 and to reactor 59 through lines 85 and 60. Make-up acid is introduced as needed through line 86. A portion of the dilute sulfuric acid before concentration in evaporator 57 may be passed to reactor 42 by means of line 87 to maintain the preferred sulfuric acid strength for the selective sulfonation.

Alternative procedures, in the embodiment of Figure 3, for the recovery of a higher purity concentrate of meta-xylene in high yield involved combining the raffinate from extractor 49 with the mother liquor from separator 75 by means of line 58 and either fractionally hydrolyzing or fractionally crystallizing the resulting mixture to obtain therefrom a high purity concentrate of the meta-isomer in good yield. For reasons of simplicity these latter procedures are not shown in Figure 3.

The following examples will further illustrate the present invention.

Example I

This example illustrates, for the phase separation step, the relative distribution between the intermediate and lower phases of different complete sulfonation reaction mixtures. Each separation was conducted at 25° C. The following table shows the results obtained:

| Composition of the Complete Sulfonation Mixture, Wt. Percent [1] | | | Percent $H_2SO_4$ in Aqueous Sulfuric Acid | Phase Distribution Vol. Percent [1] | |
|---|---|---|---|---|---|
| Xylene Sulfonic Acid | $H_2SO_4$ | $H_2O$ | | Intermediate Phase | Lower Phase |
| 10 | 72 | 18 | 80 | 3 | 97 |
| 15 | 68 | 17 | 80 | 16 | 84 |
| 16 | 60.5 | 23.5 | 72 | 24 | 76 |
| 20 | 64 | 16 | 80 | 31 | 69 |
| 25 | 60 | 15 | 80 | 52 | 48 |
| 30 | 56 | 14 | 80 | 82 | 18 |
| 32 | 53 | 15 | 78 | 69 | 31 |
| 35 | 47.5 | 17.5 | 73 | 72 | 28 |
| 35 | 52 | 13 | 80 | 98 | 2 |

[1] Calculated on a xylene free basis. The mixtures also contained xylenes in excess of the soluble amount.

From the above table it may be seen that the relative size of the intermediate phase increases with increased xylene sulfonic acid concentration in the sulfonated mixture.

Example II

This example illustrates, for the phase separation step, the effect of temperature and the distribution of xylene sulfonic acids between the intermediate and lower phases. Mixtures containing by weight 21% xylene sulfonic acids 55% $H_2SO_4$, 21% $H_2O$, and 3% xylenes were utilized. The results obtained are shown in the following table:

| Temperature, °C. | Phase Distribution, Weight Percent of Total Mixture | | | Composition of Intermediate Phase, Weight Percent [1] | | | Composition of Lower Phase, Weight Percent | | | Percent Total Xylene Sulfonic Acids in Intermediate Phase |
|---|---|---|---|---|---|---|---|---|---|---|
| | Upper Phase | Intermediate Phase | Lower Phase | Xylene Sulfonic Acids | $H_2SO_4$ | $H_2O$ | Xylene Sulfonic Acids | $H_2SO_4$ | $H_2O$ | |
| 25 | 2 | 36 | 62 | 51 | 34 | 15 | 6 | 70 | 24 | 84 |
| 50 | 1.3 | 31.8 | 66.9 | 54 | 32 | 14 | 7 | 69 | 24 | 79 |
| 100 | 0.9 | 27.0 | 71.1 | 59 | 28 | 13 | 10 | 67 | 23 | 69 |
| 130 | 0.6 | 22.8 | 76.6 | 58 | 28 | 14 | 14 | 63 | 23 | 55 |

[1] Calculated on a xylene free basis. The intermediate phase also contains a minor amount of dissolved xylenes.

As may be seen from the above table, at higher temperatures less of the total xylene sulfonic acids is contained in the intermediate phase although the concentration of these acids in the intermediate phase is increased. The table shows that the phase separation readily occurs at least throughout the temperature range of 25° C. to 130° C. It further illustrates that a relatively low temperature is desirable for the phase separation, because low temperature aids in keeping the sulfonic acids out of the lower phase.

*Example III*

This example illustrates conditions for conducting the selective hydrolysis step of the process of Figure 1. A mixture of xylene sulfonic acids and aqueous sulfuric acid was fractionally hydrolyzed by steam distillation at temperatures in the range of 130° C. to 135° C. The charge mixture comprised 46% xylene sulfonic acids, 42% $H_2SO_4$, and 12% $H_2O$. The following table summarizes the results obtained:

| | Percent Meta | Percent Para | Percent Ortho | Percent Ethylbenzene | Percent Meta Recovery |
|---|---|---|---|---|---|
| Charge Xylene Sulfonic Acids | 47 | 20 | 22 | 11 | |
| Hydrolysis product comprising 44% of charge | 88 | 2 | | 10 | 82 |

The results show that more than 80% of the meta-xylene can be obtained in a purity of 88%.

*Example IV*

The present example is directed to the crystallization step which is applicable to the processes of both Figures 1 and 3. Mixtures comprising by weight 11% xylene sulfonic acids and 89% aqueous sulfuric acid were cooled to temperatures in the range of 0° C. to 40° C. and para-xylene sulfonic acid crystallized therefrom. The composition of the xylene sulfonic acid portion comprised by volume 46% para-xylene, 41% meta-xylene, 8% ortho-xylene, and 5% ethylbenzene sulfonic acids. Each crystallization was conducted for 1 hour but both temperature and $H_2SO_4$ concentration were varied. The resulting crystals were completely hydrolyzed. The following table shows the results obtained:

| Crystallization Temperature, °C. | Weight Percent $H_2SO_4$ (On a xylene sulfonic acid free basis) | Crystal Composition Vol. Percent (After complete hydrolysis) | | | | Volume Percent Recovery of Hydrolyzed Para-xylene |
|---|---|---|---|---|---|---|
| | | Percent Para | Percent Meta | Percent Ortho | Percent Ethylbenzene | |
| 0 | 39 | 95 | 4 | 1 | 0 | 64 |
| 25 | 40 | | | | | 0 |
| 25 | 50 | 96 | 4 | 0 | 0 | 64 |
| 25 | 60 | 96 | 4 | 0 | 0 | 75 |
| 25 | 68 | 98 | 2 | 0 | 0 | 30 |
| 25 | 70 | | | | | 0 |
| 40 | 60 | 95 | 5 | 0 | 0 | 31 |

From these results it can be concluded that at about 25° C. the concentration of the $H_2SO_4$ in the aqueous sulfuric acid portion should be in the range of about 50% to 65%.

*Example V*

A mixture of xylene sulfonic acids and 60% aqueous sulfuric acid comprising by weight 17% xylene sulfonic acids and 83% aqueous sulfuric acid was maintained at a crystallization temperature of 25° C. for one hour. The composition of the xylene sulfonic acid portion was the same as in Example IV. The resulting crystals were separated and totally hydrolyzed. A 92% concentrate of para-xylene in 86% recovery was obtained.

*Example VI*

A xylene mixture comprising by volume 60% meta-xylene, 24% para-xylene, 4% ortho-xylene, 10% ethylbenzene, and 2% saturate hydrocarbons was reacted with 94% sulfuric acid in amount equivalent to 2 moles of $H_2SO_4$ per mole of xylenes at temperatures in the range of 20° C. to 55° C. for 42 minutes. The reaction mixture was cooled and separated, 33% of the xylene charge being recovered in the unsulfonated xylene layer. Dissolved xylenes were extracted from the sulfonated layer with pentane and recovered by distillation. The recovered xylenes contained by volume 82% para-xylene, 4% meta-xylene, 6% ortho-xylene, 6% ethylbenzene, and 2% toluene, and constituted about 10% of the total para-xylene charged.

We claim:

1. A method for the separation of xylene sulfonic acids from sulfuric acid which comprises adding an aromatic hydrocarbon to a homogeneous mixture of xylene sulfonic acids and aqueous sulfuric acid having a composition falling within the area ABCDEF of Fig. 2, in an amount sufficient to saturate said mixture at a temperature below that at which reaction of the sulfuric acid with the aromatic hydrocarbon will occur, whereby to cause separation of the mixture into a sulfonic acid phase and a sulfuric acid phase, and separately recovering each phase.

2. The method according to claim 1 in which the mixture has a composition falling within the area GHIJ of Fig. 2.

3. The method according to claim 1 in which the added aromatic hydrocarbon comprises a xylene.

4. A process for separating isomeric xylenes which includes reacting a hydrocarbon mixture comprising para xylene and meta xylene with sulfuric acid to completely sulfonate said xylenes, the sulfuric acid used to sulfonate the xylenes being of a strength and in an amount such as to yield a homogeneous reaction product comprising xylene sulfonic acids and aqueous sulfuric acid, and having a composition falling within the area ABCDEF of Fig. 2, cooling said reaction product to a temperature below that at which reaction of sulfuric acid in the reaction product with aromatic hydrocarbons will occur, adding to the cooled reaction product a quantity of an aromatic hydrocarbon sufficient to saturate the reaction product whereby to cause separation of the product into a sulfonic acid phase and an aqueous sulfuric acid phase, recovering the sulfuric acid phase and recycling it to the sulfonation step of the process, recovering the sulfonic acid phase, recovering a para xylene sulfonic acid concentrate from the sulfonic acid phase by fractional crystallization, hydrolyzing the para xylene sulfonic acid concentrate, and recovering a para xylene concentrate.

5. The process according to claim 4 in which the sulfonation reaction product has a composition falling within the area GHIJ of Fig. 2.

6. The process according to claim 4 in which the added aromatic hydrocarbon comprises a xylene.

7. In a process for separating a xylene mixture comprising meta- and para-xylenes, the steps which comprise treating such mixture with sulfuric acid to sulfonate substantially all the xylenes therein and to form a mixture comprising xylene sulfonic acids and aqueous sulfuric acid which mixture has a composition within the area ABCDEF of Fig. 2, introducing into the sulfonated mixture a liquid aromatic hydrocarbon in excess of the amount soluble in such mixture, separating the resulting mixture into a xylene sulfonic acid phase and an aqueous sulfuric acid phase in a separation zone, separately removing the phases from the separation zone, subjecting the xylene sulfonic acid phase to fractional hydrolysis to separate a meta-xylene concentrate, cooling the hydrolysis residue to precipitate para-xylene sulfonic acid, and hydrolyzing the para-xylene sulfonic acid to obtain a para-xylene concentrate.

8. Process according to claim 7 wherein the sulfonated mixture has a composition within the area GHIJ of Fig. 2, and wherein the liquid aromatic hydrocarbon is a portion of said meta-xylene concentrate.

9. In a process for separating a xylene mixture containing meta- and para-xylenes and also containing saturate hydrocarbon, the steps which comprise treating such mixture with sulfuric acid to sulfonate substantially all the xylenes therein and to form a mixture comprising xylene sulfonic acids and aqueous sulfuric acid which mixture has a composition within the area ABCDEF of Fig. 2, separately removing the unsulfonated saturate hydrocarbon, cooling the sulfonated mixture to a temperature in the range of about 25° C. to 50° C., introducing into the cooled mixture meta-xylene in excess of the amount soluble in said mixture, separating the resulting mixture into a xylene sulfonic acid phase and an aqueous sulfuric acid phase in a separation zone, separately removing the phases from the separation zone, subjecting the xylene sulfonic acid phase to fractional hydrolysis to separate a meta-xylene concentrate, cooling the hydrolysis residue to precipitate para-xylene sulfonic acid, and hydrolyzing the para-xylene sulfonic acid to obtain a para-xylene concentrate.

10. Process according to claim 9 wherein the sulfonated mixture has a composition within the area GHIJ of Fig. 2.

References Cited in the file of this patent

UNITED STATES PATENTS

| | | |
|---|---|---|
| 2,348,329 | Cole et al. | May 9, 1944 |
| 2,403,972 | Friedman | July 16, 1946 |
| 2,511,711 | Hetzner et al. | June 13, 1950 |
| 2,585,525 | Yates | Feb. 12, 1952 |
| 2,655,530 | Nevison | Oct. 13, 1953 |
| 2,718,526 | Mammen | Sept. 20, 1955 |